(12) United States Patent
Abeln et al.

(10) Patent No.: US 8,788,631 B2
(45) Date of Patent: *Jul. 22, 2014

(54) ADD-INS DYNAMICALLY EXTENDING DISPLAY TARGETS AND BUSINESS-LOGIC PROGRAMMING MODEL

(75) Inventors: Christian Olaf Abeln, Helsingborg/Ödåkra (SE); Mehmet Kerem Kiziltunc, Glostrup (DK); Stuart Glasson, Copenhagen (DK); Thomas Sondergaard Jensen, Smørum (DK); Uffe Kjall, Værløse (DK)

(73) Assignee: Microsoft Corporation, Redmond, WA (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/216,143

(22) Filed: Aug. 23, 2011

(65) Prior Publication Data
US 2012/0054496 A1    Mar. 1, 2012

Related U.S. Application Data

(63) Continuation of application No. 12/477,797, filed on Jun. 3, 2009, now Pat. No. 8,005,930.

(51) Int. Cl.
*G06F 15/177* (2006.01)
*G06F 9/44* (2006.01)

(52) U.S. Cl.
USPC ............................ 709/220; 717/171; 719/331

(58) Field of Classification Search
None
See application file for complete search history.

(56) References Cited

U.S. PATENT DOCUMENTS

| | | | |
|---|---|---|---|
| 7,668,782 B1 | 2/2010 | Reistad et al. | |
| 8,005,930 B2 | 8/2011 | Abeln et al. | |
| 2003/0063120 A1* | 4/2003 | Wong et al. | 345/746 |
| 2004/0215700 A1 | 10/2004 | Shenfield et al. | |
| 2007/0198940 A1 | 8/2007 | Beran et al. | |

(Continued)

OTHER PUBLICATIONS

Puder, A., "XML11—An Abstract Windowing Protocol," San Francisco State University, http://citeseerx.ist.psu.edu/viewdoc/download?doi=10.1.1.97.9085&rep=rep1&type=pdf, Aug. 30, 2005, 15 pages.

(Continued)

*Primary Examiner* — Wei-Tai Lin
(74) *Attorney, Agent, or Firm* — Damon Rieth; Brian Haslam; Micky Minhas

(57) ABSTRACT

A system for extending an enterprise resource planning application is provided. The system employs "Add-ins" that each have a functional behavior that is independent of the client on which it executes and a user interface behavior that is dependent on the characteristics of the display, and other characteristics, of the client (i.e., a display target). When a user attempts to invoke an Add-in via the client runtime, the client runtime determines whether the Add-in is available at the user's computer. If not, the client runtime downloads the appropriate artifact for execution at the user's computer. In this environment, neither the client runtime nor the server-side business logic contains the logic used to implement a particular Add-in behavior on the supported display targets. Instead, this logic is contained within separate artifacts associated with a single Add-in having a particular behavior, each artifact implementing the behavior for a specific display target.

10 Claims, 8 Drawing Sheets

(56) References Cited

U.S. PATENT DOCUMENTS

| | | |
|---|---|---|
| 2007/0283368 A1 | 12/2007 | Tsuji et al. |
| 2008/0109801 A1* | 5/2008 | Levine et al. ............... 717/171 |
| 2008/0255962 A1 | 10/2008 | Chang et al. |
| 2008/0271059 A1 | 10/2008 | Ott et al. |
| 2008/0271127 A1 | 10/2008 | Naibo et al. |
| 2009/0007056 A1 | 1/2009 | Prigge et al. |
| 2009/0024944 A1 | 1/2009 | Louch et al. |
| 2009/0049427 A1 | 2/2009 | Zhao |
| 2009/0070162 A1 | 3/2009 | Leonelli et al. |
| 2009/0271777 A1 | 10/2009 | Tow et al. |

OTHER PUBLICATIONS

Schmidt, K. et al, "From Business Rules to Application Rules in Rich Internet Applications," BIS 2008, LNBIP 7, Springer-Verlag Berlin Heidelberg, 1 page.

Wellhausen, T., "Business Logic in the Presentation Layer. Design Patterns on the Implementation of Business Logic on the Client-Side," http://www.tim-wellhausen.de/papers/BusinessLogic.pdf, Jan. 5, 2007, 16 pages.

Tai, H. et al, "Model-driven Development of Large-Scale Web Applications," IBM Journal of Research and Development, Sep.-Nov. 2004, 3 pages.

* cited by examiner

| Add-in store | | | | | | | |
|---|---|---|---|---|---|---|---|
| Add-in | version | display target | permission | logic | interface | user-customizable options | key |
| Chart1 | 1 | desktop, XP | ... | ... | ... | ... | key$_0$ |
| Chart1 | 1 | mobile | ... | ... | ... | ... | key$_1$ |
| ... | ... | ... | ... | ... | ... | ... | ... |
| Chart2 | 2 | desktop, Vista | ... | ... | ... | ... | key$_2$ |

*FIG. 4*

ADD-INS DYNAMICALLY EXTENDING DISPLAY TARGETS AND BUSINESS-LOGIC PROGRAMMING MODEL

CROSS REFERENCE TO RELATED APPLICATION

This application is a continuation application of U.S. patent application Ser. No. 12/477,797, filed on Jun. 3, 2009, now U.S. Pat. No. 8,005,930 issued Aug. 23, 2011, which is incorporated herein in its entirety by reference.

BACKGROUND

Enterprise Resource Planning ("ERP") software is a type of software used by many companies to plan and manage various business functions, such as budgeting, accounting, human resources, inventory management, customer relationship management, and so forth. Typically a customer or a third-party consultant will customize an ERP application to satisfy that customer's specific business requirements. To customize an ERP application, the customer or consultant may develop custom code that uses functionality exposed by the ERP application. Such customizations may improve the usability of the ERP applications or provide additional functionality.

A typical ERP software environment includes server-side components and client-side components. The server-side components typically include databases storing company information (e.g., inventory, customer data, purchase order reports, invoicing reports) along with business logic for interacting with the data. The client-side components typically include a generic client-side runtime configured to interact with the server-side business logic. For example, company employees distributed throughout the company's offices may each run the generic client-side runtime that interacts with server-side business logic to monitor inventory, conduct sales transactions, process orders, complete shipping requests and so on through a number of forms, pages, tables, codeunits, etc., provided by the ERP software. The generic client-side runtime includes logic for interacting with a user regardless of the configuration of the computer on which the client is running. The characteristics of these configurations, or "display targets," include, among other things, the operating system and runtime environment (e.g., MICROSOFT WINDOWS VISTA, MICROSOFT WINDOWS XP, MICROSOFT WINDOWS MOBILE, MICROSOFT INTERNET INFORMATION SERVER), rendering and display methods (e.g., MICROSOFT WINDOWS GUI, MICROSOFT SILVERLIGHT, mobile phone, 14" CRT monitor, 22" LCD screen), user input methods (e.g., keyboard, mouse, scanner, voice, gesture), and network connectivity (e.g., persistent, high-speed, dial-up). Due to the number of characteristics, the number of display targets can become quite overwhelming. Accordingly, the generic client-side runtime, which includes logic for each display target, can become cumbersome.

SUMMARY

A system for extending an ERP software application is provided. The system employs "Add-ins" that each have a functional behavior that is independent of the client on which it executes and a user interface behavior that is dependent on the characteristics of the display, and other characteristics, of the client (i.e., a display target). The functional and user interface behavior of the Add-in are implemented via a number of display target-specific Add-in implementations, or "artifacts," for exhibiting the functional behavior of the Add-in on a specific display target, as specified by a user interface behavior. In this way, each client computer need not store logic for exhibiting the behavior of the Add-in on display targets that are not associated with the client. In some embodiments, a particular Add-in may interact with the business logic via a default interface. The default interface allows the business logic to, for example, set values associated with each artifact, read values associated with each artifact, bind an artifact to data, and send and receive events to and from an artifact. In some embodiments, an Add-in vendor, or Add-in developer, may extend or modify the default interface to customize the way that the Add-in interacts with the ERP software. As an example of a custom interface, the vendor may associate custom metadata and properties with the Add-in along with custom methods, events, and data bindings for manipulating and using the custom information. The custom interface may be made discoverable to an ERP software developer, or development environment in which the ERP software developer is working, via an interface manifest or a discoverable interface attributisation. Accordingly, an ERP software developer will need to modify the ERP software to interact with the Add-in via the custom interface. In some embodiments, the vendor may provide a personalization interface that defines data points by which an end user can personalize the visual appearance and/or interaction behaviors of a user interface behavior of an Add-in implementation. The vendor may distribute the Add-in package to a number of ERP software developers or post the Add-in package on a website for ERP software developers where the developers can download it for free or for a fee. In some embodiments, once the Add-in package is available to an ERP software developer, the ERP software developer can integrate the behavior of the Add-in into the ERP software. When a user attempts to invoke an Add-in via the client runtime, the client runtime determines whether the Add-in is available at the user's computer. If it is not, the client runtime requests the Add-in by sending an indication of the display target associated with the user's computer to, for example, the server executing the server-side business logic. Upon receiving the request, the server computer determines whether the Add-in is available for the specified display target, and if so, whether the requesting user has permission to use the Add-in. If so, the server computer sends the appropriate artifact in a distributable artifact package, or an indication of where the appropriate artifact can be retrieved, to the user's computer and the user's computer loads the distributable artifact package and enables the artifact for execution. In this environment, neither the client runtime nor the server-side business logic contains the logic used to implement a particular Add-in behavior on the supported display targets. Instead, this logic is contained within separate artifacts associated with a single Add-in having a particular behavior, each artifact implementing the behavior for a specific display target. Furthermore, the server-side business logic need not be aware of the individual display target implementation of an Add-in artifact in order to interact with the artifact.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a block diagram illustrating a table representing an Add-in store in some embodiments.

DETAILED DESCRIPTION

Figure 1:
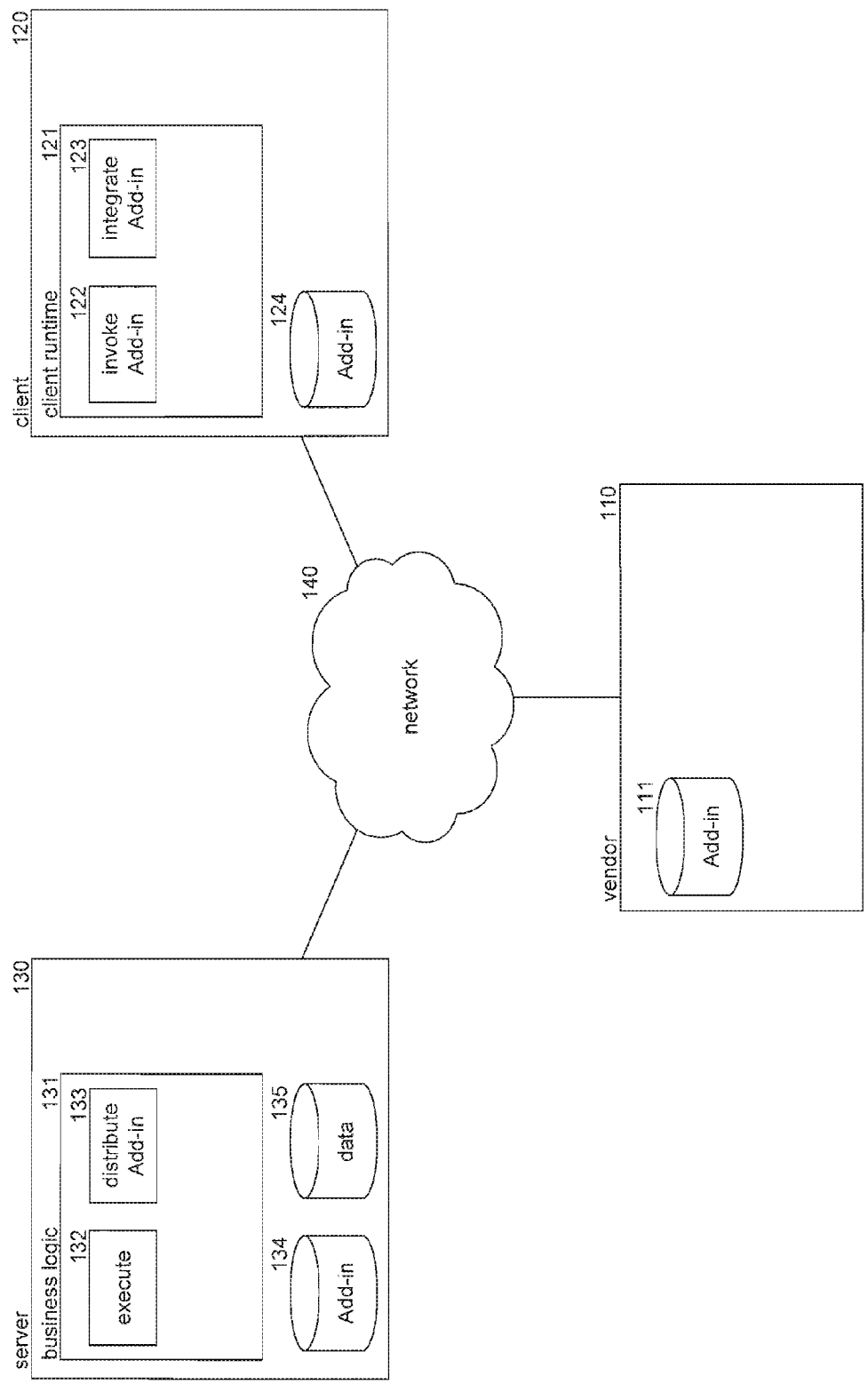
FIG. 1 is a block diagram illustrating various components of the system for extending an enterprise resource planning application in some embodiments.

A system for extending an ERP software application is provided. The system employs "Add-ins" that each have a functional behavior that is independent of the client on which it executes and a user interface behavior that is dependent on the characteristics of the display, and other characteristics, of the client (i.e., a display target). For example, the functional behavior of an Add-in may be to display a chart indicating the profitability of a product line over time. One user interface behavior for a large display may be to display the entire graph with a graph line representing each product in the product line. Another user interface behavior for a small display (e.g., of a cell phone) may be to display a separate graph for each product and allow the user to cycle through the graphs, displaying one at a time. The functional and user interface behaviors of the Add-in are implemented via a number of display target-specific Add-in implementations, or "artifacts," used to exhibit the functional behavior of the Add-in on a specific display target, as specified by the user interface behavior. Thus, one can think of the Add-in as having a display target-independent functional behavior (e.g., displaying a user interface control) that is implemented via a number of display target-specific implementations that can be distributed, individually, to client computers based on an associated display target. In this way, each client computer need not store logic for exhibiting the behavior of the Add-in on display targets that are not associated with the client. In some embodiments, the Add-in implementations may be packaged into a single distributable Add-in package for storage at a server computer for subsequent distribution to client computers on an individual Add-in implementation basis.

By way of example, an Add-in vendor may provide an Add-in whose behavior is to display a chart for illustrating current inventory flow and allow a user to interact with the chart. To create the logic for exhibiting the functional behavior of the Add-in on different display targets, the vendor generates separate Add-in implementations for different display targets, such as the display targets where the new chart may be displayed, each Add-in implementation specifying a different user interface behavior. For example, the Add-in vendor may generate one Add-in implementation for displaying and interacting with the chart on a computer executing MICROSOFT WINDOWS XP and having a keyboard, mouse, and 24" LCD screen and another Add-in implementation for displaying and interacting with the chart on a device executing MICROSOFT WINDOWS MOBILE and having a touch screen with a resolution of 320 pixels×320 pixels. Furthermore, each Add-in implementation implements an interface common to the Add-in so that the ERP software can interact with the Add-in regardless of the display target with which the ERP software is interacting. In other words, while each Add-in implementation provides a user interface behavior specific to a display target, the Add-in implementations of a specific Add-in share a common interface which is, therefore, display target-independent. Once the Add-in implementations are generated, the Add-in vendor may then distribute the Add-in implementations to ERP software developers for integration into the ERP software.

An ERP software developer may integrate the Add-in into ERP software used to display the chart to users of the ERP software through the client runtime by, for example, adding the chart to a page of the ERP software. When a client runtime attempts to exhibit the behavior of the Add-in, the client runtime, if necessary, downloads the appropriate display target-specific Add-in implementation (i.e., the Add-in implementation associated with the display target of a user's computer) in a distributable format and, if necessary, loads the Add-in implementation for execution. The logic of the page on which the chart is to be displayed may pass data to the Add-in implementation for display. For example, the page, executing within the client runtime environment and implemented by the ERP software developer to include the Add-in, may query the server-side business logic for inventory data and pass this data to the Add-in implementation along with position and dimension information that is used to render the chart. The Add-in implementation may include logic for receiving the data, generating the chart based on the data, and rendering the chart on the display target of the user's computer. As another example, the Add-in implementation may pass a chart object to the page of the client runtime, which may invoke a display method of the object to display the chart.

As another example, an Add-in vendor may provide an Add-in whose functional behavior is to display current shipping information, such as the current location of a shipment. Each Add-in implementation may provide a different user interface behavior for displaying the shipping information to a user. For example, Add-in implementations associated with display targets having relatively large display areas (e.g., desktop computer systems) may display a large map with position information for multiple shipments along with comprehensive information about each shipment (e.g., intended recipient, order date, shipping date), while Add-in implementations associated with display targets having relatively small display areas (e.g., handheld devices) may display a small map with location information for a single shipment and a link for comprehensive information about the shipment. Each Add-in implementation may be configured to periodically retrieve the shipping information from, for example, a database of the ERP software and/or from a third-party source, and inform the ERP software (e.g., the page of the ERP software displaying the shipping information provided by the Add-in implementation via the client runtime) that updated shipping information is available. The ERP software may then retrieve the updated shipping information from the Add-in implementation for display via the client runtime.

In some embodiments, a particular Add-in implementation may interact with the business logic via a default interface. The default interface allows the business logic to, for example, set values associated with an Add-in implementation, read values associated with an Add-in implementation, bind an Add-in implementation to data, and send and receive events to and from an Add-in implementation. As an example, the vendor may want to display inventory information in a new chart. Through a number of default methods and routines of the default interface, an Add-in implementation can download the necessary inventory information from the ERP software by sending requests through the client runtime to the server-side business logic. Once the information is downloaded, the display target-specific logic of the Add-in implementation can generate and render the chart at the client based on the information. In this manner, the vendor can focus on implementing the functional and user interface behaviors of each Add-in implementation without implementing separate interfaces to the ERP software. As another example, the business logic may be designed to handle and respond to certain events raised by an Add-in implementation. For example, when a user changes the metadata of a form (e.g., shape, size, color, position), the business logic may be invoked, via an event handler, to store this information. Similarly, when the user opens the form, an event handler may be invoked to retrieve this information so that the form can be reconfigured to the user's preferences. Given these default events and event handlers, the vendor may choose to raise certain events to take advantage of the default interface provided by the ERP software.

In some embodiments, the vendor may extend or modify the default interface to customize how the Add-in interacts with the ERP software. As an example of a custom interface, the vendor may associate custom metadata and properties with the Add-in along with custom methods, events, and data bindings for manipulating and using the custom information. The custom interface may be made discoverable to the ERP software developer, or the development environment in which the ERP software developer is working, via an interface manifest or a discoverable interface attributisation. The interface manifest or attributisation provides an indication of the custom methods, properties, events, etc., of the custom interface. In some embodiments, elements of an Add-in are made discoverable, for example, by marking the interface with a "[ControlAddInExportAttribute]" attribute, For example, the vendor may cause the inventory chart to update dynamically as the inventory information changes and signal a custom event to the ERP software via a customer interface when the chart is updated. By marking the custom interface with the "[ControlAddInExportAttributer]" attribute, the vendor makes the custom interface discoverable to an ERP software development environment and an ERP software developer so that the ERP software developer can determine how to modify the ERP software in order to interact with the Add-in correctly. Accordingly, an ERP software developer will need to modify the ERP software to handle the custom event, for example, by retrieving the updated chart from an Add-in implementation.

In some embodiments, when the vendor generates the Add-in implementations for the Add-in, the vendor may add the Add-in implementations to an Add-in package and make the Add-in package available to ERP software developers. For example, the vendor may distribute the Add-in package in a distributable format to a number of ERP software developers or post the Add-in package on a website where ERP software developers can download it for free or for a fee. In some embodiments, the ERP software may provide an environment defining the display target-independent interface for an Add-in and the Add-in implementations associated with the Add-in.

In some embodiments, the vendor may provide a personalization interface that defines data points by which an end user can personalize the visual appearance and/or interaction behaviors of a user interface behavior of an Add-in implementation. For example, an end-user may personalize the layout of a form (i.e., the placement of fields, controls, etc.), the color of a chart, etc. The interface may define a number of personalization data points, such as custom metadata and properties, stored in association with an Add-in implementation at, for example, the client or the server. In some embodiments, the client runtime or Add-in implementation uses the personalization data points to render a generic personalization user interface to end users to select options or specify values for the personalization data points in order to personalize the user interface behavior. The values of personalization data points as selected or specified by the end user via the generic personalization user interface can be delivered to the Add-in implementation and may also be stored in a user personalization data stream of the ERP software application. The personalization interface may be made discoverable via an interface manifest or an attributisation of the personalization data points. The interface manifest or attributisation provides an indication of the personalization data points of the personalization interface. In some embodiments, a personalization interface of an Add-in is made discoverable, for example, by marking the interface or the personalization data points with a "[AddInPersonalization]" attribute.

in some embodiments, once available, the ERP software developer can integrate the behavior of the Add-in into the ERP software. For example, the ERP software developer may add the new chart to an inventory page, for example, by dragging and dropping an indication of the chart onto a design page for the inventory page or adding an indication of the Add-in to the metadata of the page. The ERP software developer or development environment may then identify the interface of the Add-in and, if necessary, modify the ERP software to interact with the Add-in accordingly. For example, if the vendor has chosen the default interface, the ERP software developer may not need to update the ERP software to interact with the Add-in. If the vendor has chosen a custom interface, the ERP software developer may modify the ERP software to interact with the Add-in appropriately. As mentioned above, an inventory chart Add-in may provide a dynamic display of inventory information as the inventory information changes. The ERP software developer may bind inventory data to the Add-in to provide the Add-in implementations of the Add-in with up-to-date inventory information. Once the behavior of the Add-in is integrated into the ERP software, Add-in implementations associated with the Add-in can be used to exhibit the functional behavior of the Add-in via a display target-specific implementation. For example, a client runtime executing in a MICROSOFT WINDOWS VISTA environment may download and execute one Add-in implementation associated with the Add-in and configured to receive, process, and output information in that environment while a client runtime executing in a MICROSOFT WINDOWS MOBILE environment downloads an Add-in implementation for that environment, both Add-in implementations being configured to communicate with ERP software.

When a user selects to display the inventory chart via the client runtime, the client runtime determines whether the Add-in is available at the user's computer. If not, the client runtime requests the Add-in by sending an indication of the display target associated with the user's computer to, for example, the server executing the server-side business logic. Upon receiving the request, the server computer determines whether the Add-in is available for the specified display target, and if so, whether the requesting user has permission to use the Add-in. If so, the server computer sends the user's computer the appropriate Add-in implementation in a distributable artifact package, and the user's computer enables the Add-in implementation for execution and loads the Add-in implementation for execution. Once loaded, the Add-in implementation can, among other things, initiate a communication with the server-side business logic, client runtime, software/hardware local to the user's computer, etc. In this example, the Add-in implementation could initiate the download of inventory information from a database located at the server by sending a message to the server-side business logic through the default interface requesting the information. After obtaining the information, the Add-in implementation, executing at the client computer, may generate and render the chart via the display target-specific logic of the Add-in implementation. In some embodiments, the server-side business logic may generate information corresponding to a chart and pass this information to the Add-in implementation so it can be rendered on the client's computer using the display target-specific logic of the Add-in implementation. Similarly, as the inventory is updated on the server, the Add-in implementation receives an indication of the updates and executes the display target-specific logic of the Add-in implementation to update the chart accordingly. In this environment, neither the client runtime nor the server-side business logic contains the logic used to implement a particular Add-in behavior on the supported display targets. Instead, this logic is contained within separate Add-in implementations associated with a single Add-in having a particular functional behavior, and each Add-in implements implementing the functional behavior for a specific display target specified by a user interface behavior of the Add-in implementation.

FIG. 1 is a block diagram illustrating various components of the system for extending an enterprise resource planning application in some embodiments. The system is comprised of vendor computer 110, client computer 120, and server computer 130 connected via network 140. Vendor computer 110 includes Add-in store 111, which stores Add-ins and associated information. Client computer 120 includes client runtime 121, which includes invoke Add-in component 122 and integrate Add-in component 123, and Add-in component store 124. Client runtime 121 is the client runtime of the ERP software. Invoke Add-in 122 is invoked when a user performs an operation that requires logic implemented by an artifact (i.e., Add-in implementation). Add-in store 124 stores artifacts that implement display target-specific logic for realizing the behavior of an Add-in and information about those artifacts. Server computer 130 includes business logic 131, which contains execute component 132 and distribute Add-in component 133, Add-in store 134, and data store 135. Business logic 131 is the business logic of the ERP software. Execute component 132 is invoked when a client computer sends a request that requires an interaction with the business logic. Distribute Add-in component 133 is invoked to distribute Add-in artifacts to client computers. Add-in store 134 stores Add-ins, such as those provided by vendor 110. Data store 135 stores data used as part of the ERP software, such as inventory tables, customer tables, invoice reports, etc., and metadata pertaining to various ERP elements, such as the position, dimensions, color, etc., of an ERP form.

The computing devices on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the instructions, data structures, and message structures may be stored or transmitted via a data transmission medium, such as a signal on a communication link, and may be encrypted. Various communication links may be used, such as the Internet, a local area network, a wide area network, a point-to-point dial-up connection, a cell phone network, and so on.

Embodiments of the system may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
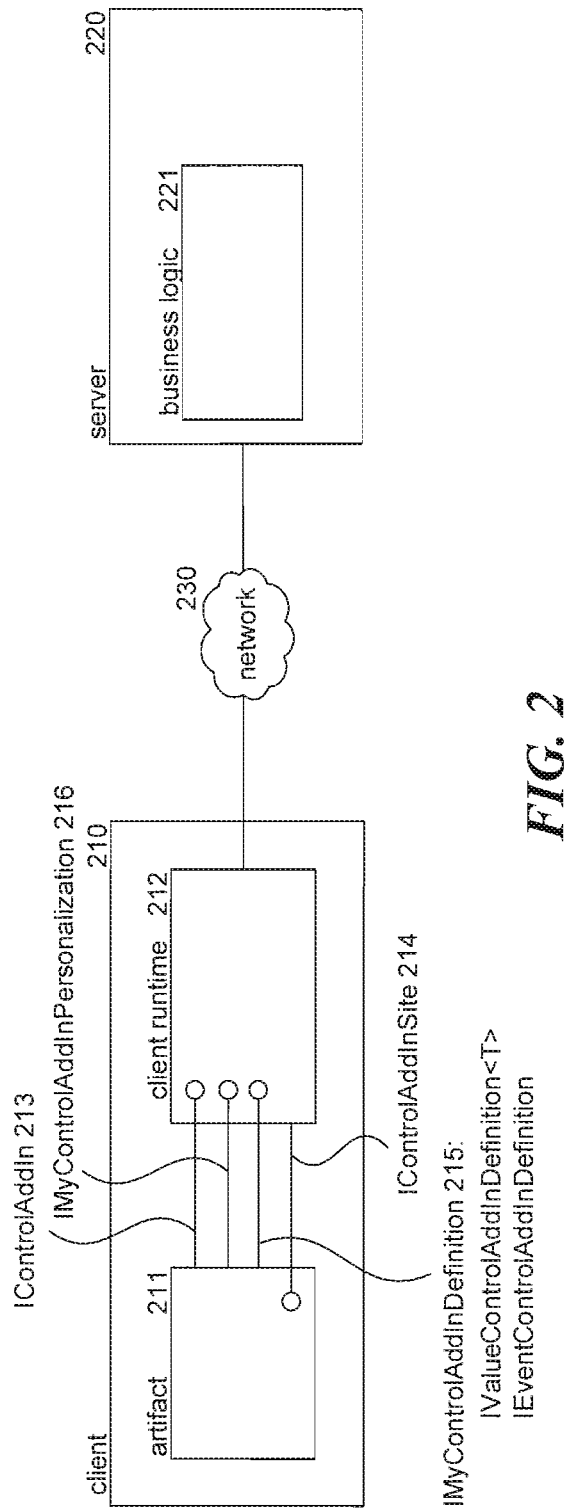
FIG. 2 is a block diagram illustrating interfaces that the client runtime uses to interact with an Add-in artifact (i.e., Add-in implementation) in some embodiments.

FIG. 2 is a block diagram illustrating interfaces that the client runtime uses to interact with an Add-in artifact (i.e., Add-in implementation) in some embodiments. In this example, client 210, which is executing artifact 211 and client runtime 212, is located remote from server 220, which is executing business logic 221. Client runtime 212 acts as an intermediary between server-side business logic 221 and artifact 211. Server-side business logic 221 can pass commands to artifact 211 through client runtime 212. In response, artifact 211 can return data to server-side business logic 221 through the client runtime 212. Artifact 211 exposes IControlAddIn interface 213, IMyControlAddinDefinition interface 215, and IMyControlAddInPersonalization interface 216 to client runtime 212 while client runtime 212 exposes IControlAddinSite interface 214 to artifact 211. IControlAddIn interface 213 enables the ERP software to recognize the artifact as an Add-in. IControlAddIn interface 213 is a base interface from which display target-specific interfaces may inherit. For example, an IWinFormsControlAddIn interface may inherit from IControlAddIn interface 213 and implement logic for initializing an Add-in in a MICROSOFT WINDOWS form control or for providing display target-specific information about the Add-in. As another example, an ISharePointControlAddIn interface may implement logic for initializing an Add-in and providing display target-specific information about the Add-in in a MICROSOFT SHAREPOINT environment. IControlAddInSite interface 214, which can be initialized with the IControlAddin interface 213, provides information for an Add-in across display targets and allows each Add-in implementation to invoke certain functionalities of the ERP software. For example, through IControlAddInSite interface 214 an artifact can retrieve information pertaining to certain information concerning the state of the artifact, such as whether the artifact is enabled or visible, and related events signifying a change to the artifact states, such as when the artifact becomes disabled or is no longer visible. IMyControlAddInDefinition interface 215 provides a custom interface for defining custom metadata, events, properties, etc., for the artifact and associated Add-in. In this example, IMyControlAddInDefinition interface 215 inherits from the IValueControlAddInDefinition<T> interface, a default interface which allows the artifact to exchange data with the ERP software, and the IEventControlAddInDefinition interface, a default interface which provides a single event for signaling an event, ControlAddIn, to the ERP software. IMyContro- IAddInPersonalization interface 216 provides a personalization interface for defining personalization data points for the artifact.

TABLE 1

```
public interface IControlAddIn
{
    void Initialize(IControlAddInSite addInControlSite);
}
public interface IControlAddInSite
{
    bool Enabled { get; }
    event EventHandler EnabledChanged;
    bool Editable { get; }
    event EventHandler EditableChanged;
    bool Visible { get; }
    event EventHandler VisibleChanged;
    string Caption { get; }
    event EventHandler CaptionChanged;
    Style Style { get; }
    event EventHandler StyleChanged;
    ValidationResult ValidationResult { get; }
    event EventHandler ValidationResultChanged;
    void SaveValue( );
}
public interface IValueControlAddInDefinition<T>
{
    T Value { get; set; }
    bool HasValueChanged { get; }
}
public interface IEventControlAddInDefinition
{
    event ControlAddInEventHandler ControlAddIn;
}
[ControlAddInExportAttribute("MyControl")]
public interface IMyControlAddInDefinition:
        IValueControlAddInDefinition<object>,
        IEventControlAddInDefinition
{
    int ZoomLevel { get; }
    event ZoomInEventHandler ZoomInRequested;
    event ZoomInEventHandler ZoomOutRequested;
    Stream ExportData(SaveFormat format);
}
[ControlAddInPersonalizationAttribute]
public interface IMyControlAddInPersonalization
{
    [PersonalizationUI(LabelResource="Resources.Color1")]
    Color DisplayColor1 { get; set; }
    [PersonalizationUI(LabelResource="Resources.Color2")]
    Color DisplayColor2 { get; set; }
}
[ControlAddInExport]
public class WinForms_MyControlAddInImplementation :
        WinFormsControlAddIn,
        IMyControlAddInDefinition,
        IMyControlAddInPersonalization
{
    //display target specific implementation for WinForms
}
[ControlAddInExport]
public class SharePoint_MyControlAddInImplementation :
        SharePointControlAddIn,
        IMyControlAddInDefinition,
        IMyControlAddInPersonalization
{
    //display target specific implementation for SharePoint
}
```

Table 1 contains a sample definition of the IControlAddIn, IControlAddInSite, IValueControlAddInDefinition<T>, IEventControlAddInDefinition, IMyControlAddInDefinition, and IMyControlAddIn Personalization interfaces in some embodiments. An Add-in exposes the IControlAddIn interface to the client runtime. The IControlAddIn interface contains a method for initializing an artifact (i.e., Add-in implementation). The client runtime exposes the IControlAddInSite interface to an Add-in. The IControlAddInSite contains several members pertaining to attributes that can be used to determine the state of an artifact while it is executing and events capable of signaling changes to those attributes. For example, the Enabled member can be used to determine whether an artifact is currently enabled, and the EnabledChanged event can be used to signal that the value of the Enabled member has changed.

An Add-in artifact may also expose the IValueControlAddInDefinition<T> interface to the client runtime. The IValueControlAddInDefinition<T> interface includes member variable Value, which is used to set and retrieve data of type T associated with the Add-in, along with a HasValueChanged member function that provides an indication as to whether Value has changed. For example, an Add-in whose behavior is to display a chart object may include an IValueControlAddInDefinition<ChartObject> interface to allow the ERP software to retrieve the chart object for display and to determine whether the chart has been changed.

An Add-in artifact may also expose the IEventControlAddInDefinition interface to the client runtime. The IEventControlAddInDefinition includes an event ControlAddIn that an artifact can use to signal events to the ERP software. For example, the ERP application developer may subscribe to certain events indicating a change to a value associated with the artifact.

An Add-in artifact may also expose a custom interface, such as IMyControlAddInDefinition to the client runtime. The IMyControlAddInDefinition may inherit from other interfaces, such as the IValueControlAddInDefinition<T> and IEventControlAddInDefinition interfaces, to expose the features of these interfaces to the client runtime. Furthermore, the IMyControlAddInDefinition can be used to define custom metadata, properties, events, etc., for the Add-in. In this example, the IMyControlAddInDefinition interface defines custom property ZoomLevel, custom event handlers, ZoomInRequested and ZoomOutRequested, and custom method ExportData. Custom property ZoomLevel may be used, for example, to indicate the current level at which information displayed by Add-in is displayed. For example, if the Add-in displayed a chart showing current inventory information, the Add-in may allow a user to zoom in on different areas of the chart to view the information at different levels of resolution. Events ZoominRequested and ZoomOutRequested enable the Add-in artifact to signal to the ERP software a user-generated request to zoom in or zoom out on the displayed information, respectively, so that the ERP software can provide the data necessary to display the information at a particular zoom level. Custom method ExportData provides a method for exporting data associated with the Add-in (e.g., a chart object, string, etc.) in a specified format (e.g., XAML, SVG, PNG, etc.).

An interface (e.g., IMyControlAddInDefinition) can be made discoverable to an ERP development environment by marking the interface with the ControlAddInExportAttribute attribute ([ControlAddInExportAttribute ("MyControl")]) so that an ERP software developer can determine how to integrate the Add-in into the ERP software. Furthermore, the ControlAddinExportAttribute enables the client runtime to discover the interface of the Add-in to ensure proper data binding of member variables exposed by the interface (e.g., Value), and to make sure that events are routed from an artifact to the proper event handler of the ERP software. Furthermore, the client runtime can provide data conversion between data of type T and an internal data format.

An Add-in artifact may also expose a personalization interface, such as IMyControlAddInPersonalization, to the client runtime. The IMyControlAddInPersonalization interface may define personalization data points. In this example, the IMyControlAddIn Personalization interface defines personalization data points displayColor1 and displayColor2 which can be used, for example, to define a user's preferred colors for displaying a chart. The IMyControlAddInPersonalization interface is marked with the ControlAddInPersonalizationAttribute attribute ([ControlAddInPersonalizationAttribute]) to indicate that the interface a personalization interface. Furthermore, each of the personalization data points are marked with the PersonalizationUI attribute (e.g., [PersonalizationUI (LabelResource="Resources Color1.")]) A generic personalization user interface can be displayed to allow a user to configure the personalization data points. The generic personalization user interface identifies the personalization date points based on the PersonalizationUI attribute and displays an indication of each personalization data point (e.g., a label such as the LabelResource value associated with the PersonalizationUI attribute of a personalization data point) and a manner for setting each personalization data point (e.g., input field, drop down list, selection buttons, etc.). In some embodiments, the Add-in may define default values for each personalization data point that a user or administrator may override. In some embodiments, a user's defined personalization data points may be stored at the server and distributed to an Add-in implementation upon request, thereby allowing the user's preferences to follow the user from display target to display target. In some embodiments, a user may define different values for the personalization data points at different display targets. In some embodiment, a custom interface, such as IMyControlAddInDefinition, may be marked with the ControlAddInPersonalizationAttribute attribute and include a number of personalization data points.

Table 1 also includes sample class headings for defining Add-in implementations (i.e., implementations for exhibiting the behavior of an Add-in on a particular display target). In this example, Table 1 includes class headings WinForms_MyControlAddInImplementation and SharePoint_MyControlAddInImplementation, corresponding to Add-in implementations for display targets "WinForms" and "SharePoint," respectively. In this example, each Add-in implementation inherits from the IWinFormsControlAddIn, IMyControlAddInDefinition, and IMyControlAddInPersonalization interfaces.

Figure 3:
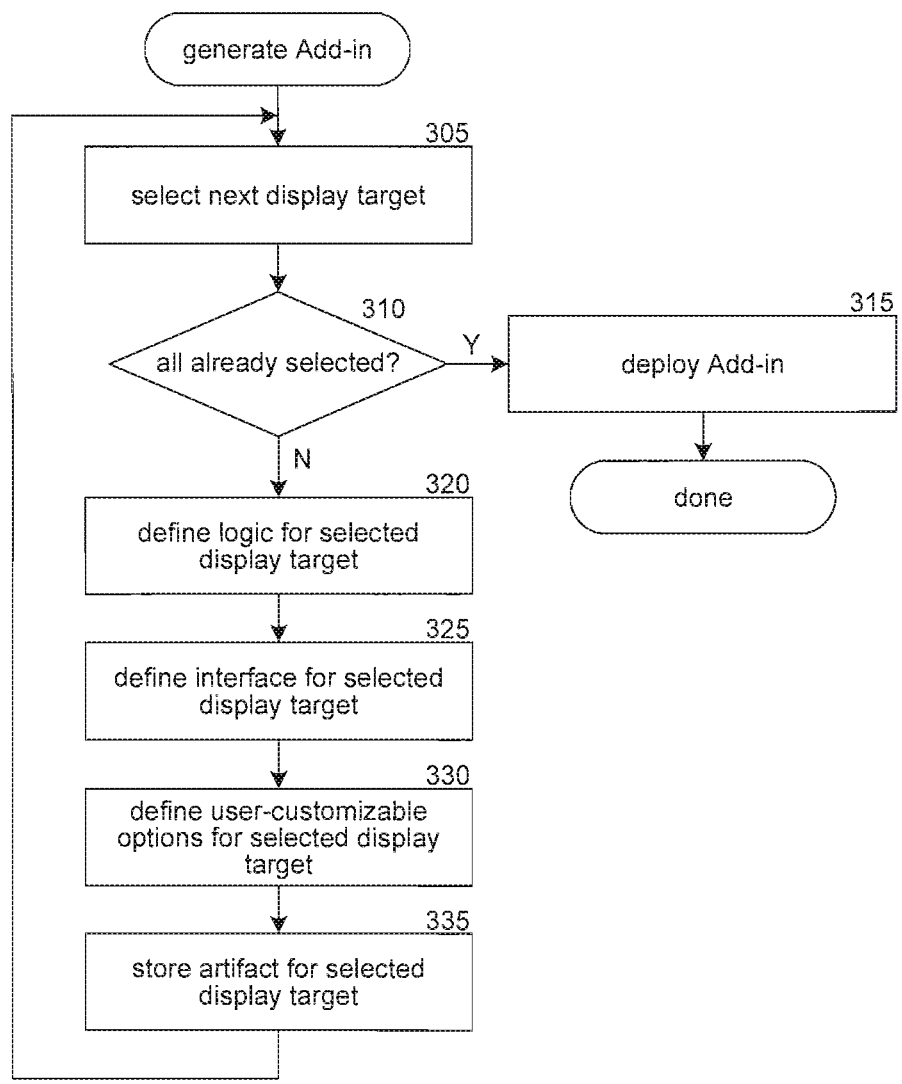
FIG. 3 is a flow diagram illustrating the steps performed by an Add-in vendor to generate an Add-in in some embodiments.

FIG. 3 is a flow diagram illustrating the steps performed by an Add-in vendor to generate an Add-in in some embodiments. In block 305, the Add-in vendor selects the next display target for which logic is to be developed for the Add-in. In decision block 310, if all of the display targets relevant to the Add-in have been selected, the Add-in vendor continues at block 315 where the Add-in vendor deploys the Add-in by, for example, distributing the Add-in to an ERP software developer, posting the Add-in on a website for others to download, etc., and then completes, else the Add-in vendor continues at block 320. In block 320, the Add-in vendor defines logic for the selected display target. For example, the Add-in vendor may include logic for rendering a user-interface button for a smartphone running WINDOWS MOBILE. In block 325, the Add-in vendor defines an interface for the selected display target. For example, the Add-in vendor may define a set method for interacting with custom metadata of the Add-in and/or custom events for the artifact. In block 330, the component defines user-customizable options for the display target. For example, the Add-in vendor may provide an option for a user to customize the color, position, or text of the user-interface button. In block 335, the component stores an artifact for the selected display target and then loops back to block 305 to select the next display target.

FIG. 4 is a block diagram illustrating a table representing an Add-in store in some embodiments. Add-in store 400 provides information about a number of artifacts (i.e., Add-in implementations) in a table consisting of name column 405, version column 410, display target column 415, permission column 420, logic column 425, interface column 430, user-customizable options column 440, and key column 450. Name column 405 provides a unique identifier for the Add-in associated with each artifact (e.g., Chart1 and Chart2). In some embodiments, the system may use a 16-byte globally unique identifier ("GUID") to uniquely identify each Add-in or artifact. Version column 410 identifies the version for the Add-in associated with the artifact. As an Add-in vendor improves and updates an Add-in or artifact, new versions may be identified with a new version numbers, reflected in version column 410. Display target column 415 identifies the display target associated with the artifact. In this example, the table stores artifacts for a desktop computer executing MICROSOFT WINDOWS XP, mobile computing devices, and a desktop computer executing MICROSOFT WINDOWS VISTA. As is clear from this example, a display target need not specify every characteristic of a computer configuration. For example, the "Chart1" Add-in includes an artifact for a desktop computer running MICROSOFT WINDOWS XP and an artifact for a mobile computing device, regardless of the operating system running on the mobile device. In this manner, an Add-in vendor need not generate a separate artifact for every single computer configuration. Permission column 420 stores an indication of the permission information for the artifact, such as which users or groups of users may or may not access the artifact and the extent of a user's access to the artifact. Logic column 425 stores an indication of the display target-specific logic that is associated with the artifact. Interface column 430 stores an indication of the logic that implements the interfaces associated with the artifact. User-customizable options column 440 stores an indication of the user-customizable options associated with the artifact. Key column 450 stores an indication of the keys that can be used to encrypt or decrypt an associated Add-in artifact. In some embodiments, the Add-in store may include additional information about artifacts, such as when it was created or who created it. Furthermore, the Add-in store may include different information based on where it is stored. For example, an Add-in store located at a user computer may not store display target information. One skilled in the art will recognize that while FIG. 4 provides an illustration that is easily comprehensible by a human reader, the actual information may be stored using different data structures and data organizations.

Figure 5:
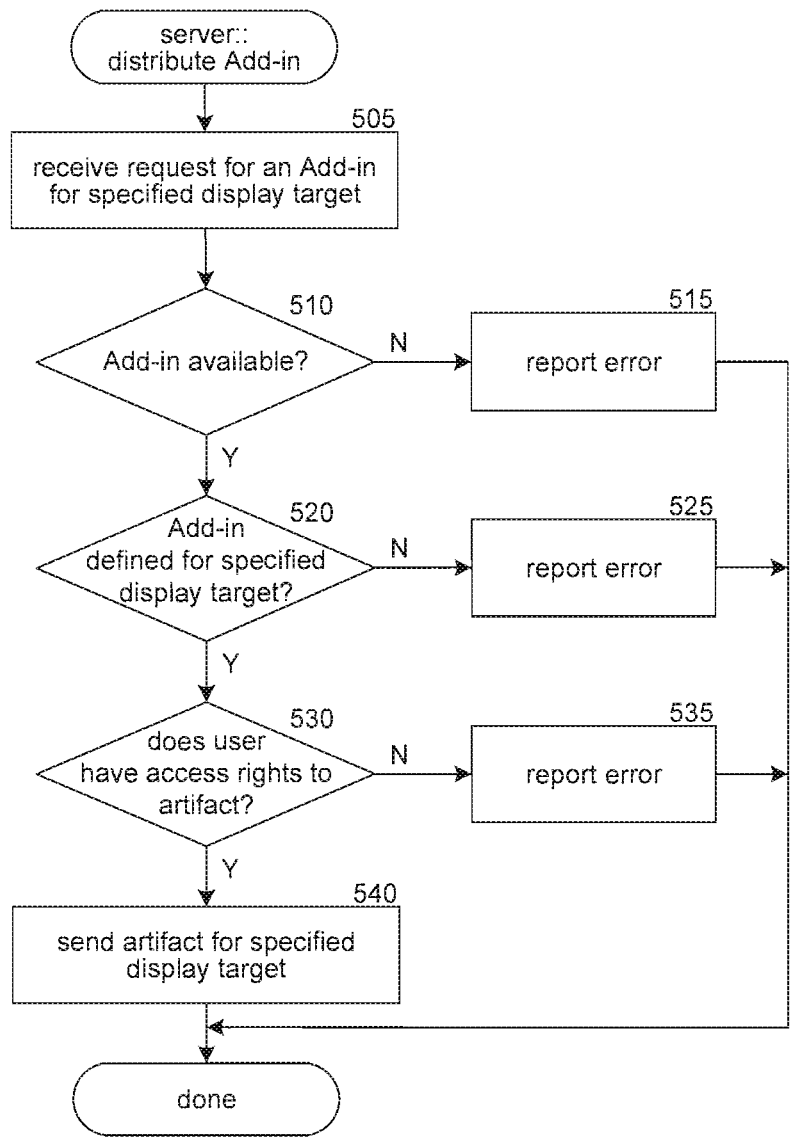
FIG. 5 is a flow diagram illustrating the processing of a distribute Add-in component of a server computer in some embodiments.

FIG. 5 is a flow diagram illustrating the processing of a distribute Add-in component of a server computer in some embodiments. The component is invoked when the server computer receives a request for an Add-in. In block 505, the component receives a request for an Add-in for a specified display target. For example, the component may receive request for a "Chart1" Add-in for a mobile device. In some examples, the request may specify a version number. In decision block 510, if the Add-in is available, then the component continues at decision block 520, else the component reports an error at block 515 and processing completes. In decision block 520, if the Add-in is defined for the specified display target, then the component continues at decision block 530, else the component reports an error at block 525 and processing completes. In decision block 530, if the user has permission to access the artifact (i.e., Add-in implementation) for the specified display target, then the component continues at block 540, else the component reports an error at block 535 and completes. In block 540 the component sends the artifact for the specified Add-in to the requesting computer and completes.

Figure 6:
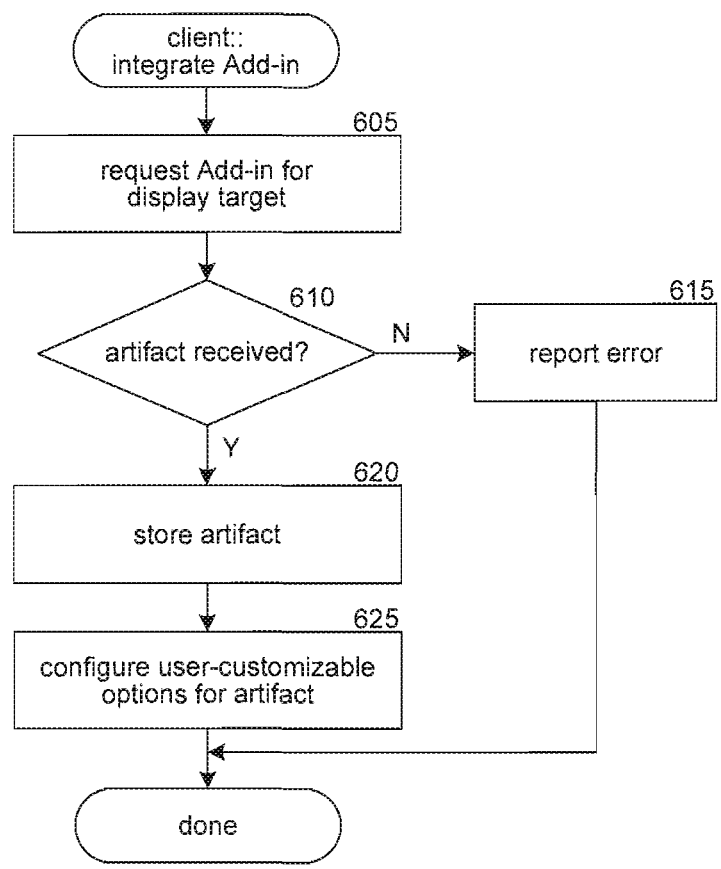
FIG. 6 is a flow diagram illustrating the processing of an integrate Add-in component of a client computer in some embodiments.

FIG. 6 is a flow diagram illustrating the processing of an integrate Add-in component of a client computer in some embodiments. In block 605, the component sends a request for an Add-in, that specifies a display target. In decision block 610, if an artifact (i.e., Add-in implementation) is received, then the component continues at block 620, else the component continues at block 615, reports an error and then completes. In block 620, the component stores the artifact, for example, by storing the information associated with the artifact in an artifact table at the client computer. In block 625, the component configures the user-customizable options of the Add-in, for example, by invoking a page of the Add-in that displays the user-customizable options and stores the options specified by the user. The component then completes.

Figure 7:
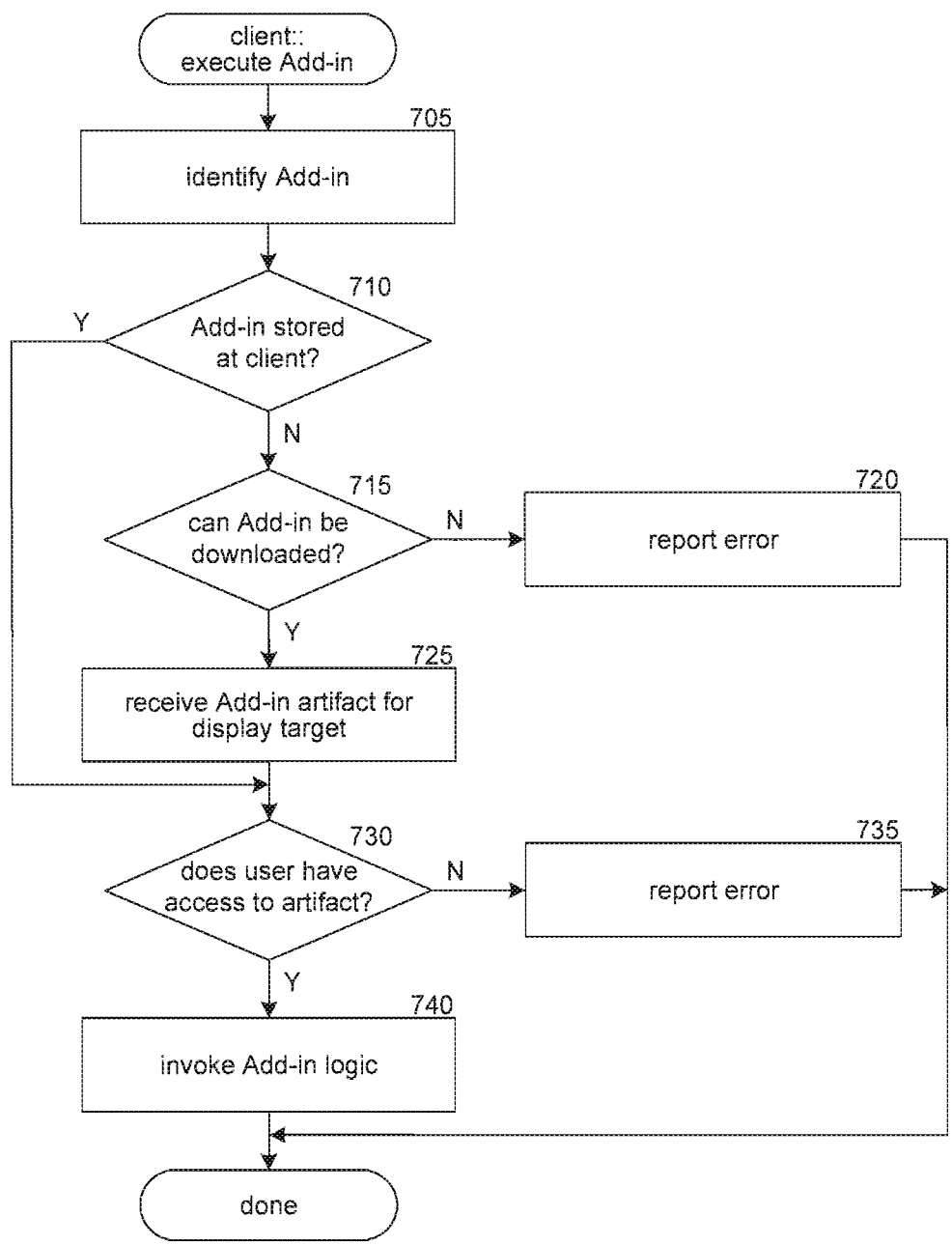
FIG. 7 is a flow diagram illustrating the processing of an execute Add-in component of a client computer in some embodiments.

FIG. 7 is a flow diagram illustrating the processing of an execute Add-in component of a client computer in some embodiments. In block 705, the component identifies the Add-in that is being executed. In decision block 710, if an artifact (i.e., Add-in implementation) for the Add-in is stored at the client, the component continues at decision block 730, else the component continues at decision block 715. In decision block 715, if an artifact for the Add-in can be downloaded for the display target associated with the client, then the component continues at block 725, else the component reports an error at block 720 and then completes. In block 725, the component receives the Add-in artifact for the display target associated with the client. In decision block 730, if the component has access to the artifact in the manner requested, then the component continues at block 740, else the component reports an error at block 735 and then completes. In some embodiments, the component determines that a user has access to the artifact by retrieving permission from an artifact table. In some embodiments, each artifact may be signed using, for example, a public key encryption scheme. In order to access a signed artifact, the client may download a key from the server computer by sending the server computer a request that includes an indication of the artifact (e.g., name of Add-in, name of Add-in and version number, or name of Add-in, version number, and display target). The component can use the key to attempt to decrypt the signed artifact and, if successful, load the artifact for processing at the client. If, however, the component does not succeed in decrypting the artifact, the artifact will not load. In this manner, the client computer is prevented from loading untrusted artifacts (e.g., artifacts that have not been certified or that come from untrusted sources) or stale artifacts (e.g., artifacts that have been replaced with a new version, artifacts of Add-ins that are no longer supported). In block 740, the component invokes the logic of the artifact to produce the behavior of the Add-in. For example, the artifact may generate and render a chart for display on the client, communicate with the server-side business logic to, for example, retrieve data for display by the client runtime, and/or communicate with software or hardware local to the client, etc. The component then completes.

Figure 8:
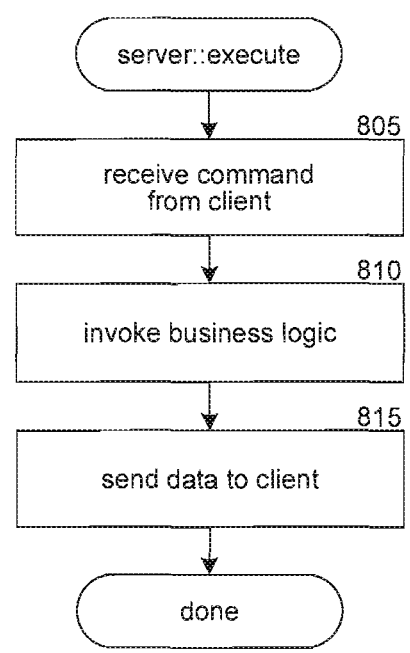
FIG. 8 is a flow diagram showing the processing of an execute component of server-side business logic executing on a server computer in some embodiments.

FIG. 8 is a flow diagram showing the processing of an execute component of server-side business logic executing on a server computer in some embodiments. In block 805, the component receives a command from a client. For example, an artifact (i.e., Add-in implementation) may request information in order to generate a chart or a form in the context of the client runtime or may signal an event that the server-side business logic is configured to handle. As another example, the client runtime may request metadata from a built-in (i.e., non-Add-in) form for display. In block 810, the component invokes the appropriate business logic. For example, the component may cause the business logic to perform a query for information or retrieve metadata for a form of the ERP software. In block 815, the component sends any generated data to the client, such as data retrieved in response to a request for data or an indication that data was successfully stored. In some situations, the server-side business logic may send data to the client without receiving an immediate request, such as when the Add-in associated with the artifact is bound to data maintained at the server. The component then completes.

Although the subject matter has been described in language specific to structural features and/or methodological acts, it is to be understood that the subject matter defined in the appended claims is not necessarily limited to the specific features or acts described above. For example, in some embodiments, an Add-in may also include logic common to each artifact that can be distributed with each artifact. Rather, the specific features and acts described above are disclosed as example forms of implementing the claims. Accordingly, the invention is not limited except as by the appended claims.

We claim:

1. A method performed by a client computer having a memory and a processor, the method comprising:

generating by the processor a request for display target-specific code implementing behavior of an Add-in, the Add-in for extending business logic of a business application;

sending to another computer from the client computer the request for the display target-specific code implementing behavior of the Add-in; and receiving from the other computer a response to the request, the response including the display target-specific code that implements behavior of the Add-in that is specific to a display target wherein the Add-in includes a plurality of implementations, each implementation including display target-specific code that implements behavior of the Add- in that is specific to a different display target and wherein each implementation provides a common interface for interacting with business logic of the business application.

2. The method of claim 1 wherein the request specifies the display target.

3. A method performed by a client computer having a memory and a processor, the method comprising:

generating by the processor a request for display target-specific code implementing behavior of an Add-in, the Add-in for extending business logic of a business application;

sending to another computer from the client computer the request for the display target-specific code implementing behavior of the Add-in;

receiving from the other computer a response to the request, the response including the display target-specific code that implements behavior of the Add-in that is specific to a display target;

invoking by a client-side component of the business application the display target-specific code; and under control of the invoked display target-specific code, sending to the other computer a message generated by the invoked display target-specific code; and in response to sending the message, receiving from the other computer a response sent using a common interface of the Add-in.

4. The method of claim 3 wherein the response is generated by the other computer executing business logic of a server-side component of the business application that is independent of the display target of the client computer.

5. A computer-readable storage device storing computer-executable instructions for controlling a client to extend a business application, by a method comprising:
   generating a request for an implementation of an Add-in that extends behavior of the business application, the implementation providing code that is specific to a display target of the client;
   sending to a server from the client the generated request for the implementation;
   receiving from the server a response to the request that includes the implementation of the Add-in that is specific to the display target; and
   executing at the client the implementation of the Add-in to extend the behavior of the business application in a manner that is specific to the display target
   wherein the Add-in includes a plurality of implementations, each implementation including display target-specific code that implements behavior of the Add-in that is specific to a different display target and
   wherein each implementation provides a common interface for interacting with business logic of the business application.

6. A computer-readable storage device storing computer-executable instructions for controlling a client to extend a business application, by a method comprising:
   generating a request for an implementation of an Add-in that extends behavior of the business application, the implementation providing code that is specific to a display target of the client;
   sending to a server from the client the generated request for the implementation;
   receiving from the server a response to the request that includes the implementation of the Add-in that is specific to the display target;
   executing at the client the implementation of the Add-in to extend the behavior of the business application in a manner that is specific to the display target; and
   under control of the executing implementation,
      sending to the server a message generated by the implementation; and
      in response to sending the message, receiving from the server a response sent using a common interface of the Add-in.

7. The computer-readable storage device of claim 6 wherein the response is generated by the server executing business logic of a server-side component of the business application that is independent of the display target of the client.

8. A computing device comprising:
   a memory storing computer-executable instructions of:
      a component that generates a request for an implementation of an Add-in that extends behavior of a business application, the implementation providing code that is specific to a display target of a client, the business application having a client-side component and a server-side component;
      a component that sends to a server the generated request for the implementation;
      a component that receives from the server a response to the request that includes the implementation of the Add-in; and
      a component that executes the implementation of the Add-in to extend the behavior of the business application in a manner that is specific to the display target; and
      wherein the Add-in includes a plurality of implementations, each implementation including display target-specific code that implements behavior of the Add-in that is specific to a different display target and
      wherein each implementation provides a common interface for interacting with business logic of the business application; and
   a processor that executes the computer-executable instructions stored in the memory.

9. A computing device comprising:
   a memory storing computer-executable instructions of:
      a component that generates a request for an implementation of an Add-in that extends behavior of a business application, the implementation providing code that is specific to a display target of a client, the business application having a client-side component and a server-side component;
      a component that sends to a server the generated request for the implementation;
      a component that receives from the server a response to the request that includes the implementation of the Add-in, the implementation providing code that is specific to one or more characteristics of the display target;
      a component that executes the implementation of the Add-in to extend the behavior of a user interface of the business application in a manner that is dependent on one or more characteristics of the display target; and
      a component that, under control of the executing implementation, sends to the server-side component a message generated by the implementation; and in response to sending the message, receives from the server-side component a response sent using a common interface of the Add-in; and
   a processor that executes the computer-executable instructions stored in the memory.

10. The computing device of claim 9 wherein the response is generated by the server-side component executing business logic that is independent of the display target of the client.

* * * * *